United States Patent Office 3,704,135
Patented Nov. 28, 1972

3,704,135
METHOD OF PREPARING A FABRICATED SKIN FROM POULTRY MEAT AND SKIN AND PRODUCT PRODUCED THEREBY
Douglas Hale, St. Louis, Mo., James C. Manuel, Belleville, Ill., and Nicholas R. Beck, Chamblee, Ga., assignors to Ralston Purina Company, St. Louis, Mo.
No Drawing. Continuation-in-part of application Ser. No. 759,510, Sept. 12, 1968. This application Feb. 8, 1971, Ser. No. 113,745
Int. Cl. A22c 21/00
U.S. Cl. 99—108
11 Claims

ABSTRACT OF THE DISCLOSURE

Poultry skin and edible poultry by-products are formed into a resultant matrix having some coarse particle sizes therein preferably by a chopping operation. A predetermined quantity of the matrix is then subjected to heat and pressure which flattens the matrix into a sheet having a desired shape and thickness. The heat is applied to the matrix for a sufficient period of time to partially coagulate or coagulate at least the surface protein of the matrix while it is under pressure. The resultant product resembles the looks, color, and taste of natural poultry skin as well as exhibiting similar handling characteristics and will adhere to the surface of poultry products in both frozen and cooked conditions.

BACKGROUND OF THE INVENTION

This application is a continuation-in-part application of Ser. No. 759,510 filed Sept. 12, 1968 entitled Fabricated Skin Coating now abandoned.

This invention relates generally to food products and more particularly to a novel and useful product which resembles natural poultry skin and which is adaptable for use in the preparation of poultry products.

In recent years many products have appeared on the market which make use of meats in other than their natural form or cut. Examples of these types of products are the poultry roasts, rolls, slices, etc. This invention relates to the preparation of a food product of this general class and more particularly to the preparation of the skin component of the foods in this class.

Presently, in the manufacture of certain of these designated products, and more particularly in the manufacture of poultry roasts and like products, it is necessary to cover the outer surface or exposed portions of the poultry meat with poultry skin. The present practice utilized is to remove the skin from the carcass of a processed bird in as large a piece as possible and then cut the skin into sheets having a size sufficient to serve as a covering for the poultry product. This is undesirable and disadvantageous because it requires a very careful skinning operation. Also, skins may not be used which have blemishes and often it is very difficult to obtain skins of the required size free from discolorations, blemishes, bruises, and similar imperfections. Further, the available skin on a poultry carcass yields at a maximum two to four skins of the size desired for the production of products of this class. Therefore, a problem exists of not having enough skins of the desired size available for the poultry products of this type which are being processed.

According to the present invention it is possible to fabricate a derma-fiber skin product which substantially resembles natural poultry skin in looks, color, taste and adhesion ability to poultry meat products in both a frozen and cooked condition. In addition, it is possible to incorporate poultry meats and/or edible poultry by-products, such as neck meat and other residual carcass meat, into the product of the present invention and still obtain a finalized product which substantially resembles natural poultry skin.

SUMMARY

Therefore, it is the general object of the present invention to provide a product which resembles natural poultry skin.

Another object of the present invention is to provide a product which utilizes certain meats and edible by-products which might otherwise be discarded.

A more specific object of the present invention is to provide a method of forming a fabricated poultry skin which utilizes comminuted poultry skin and/or poultry meat and/or edible poultry by-products to form a skin-like product having the protein partially coagulated or at least the surface protein thereof coagulated so that the product has the looks, color, and taste like natural poultry skin as well as exhibiting similar handling characteristics. In addition, the fabricated skin will adhere to formed poultry meat products of the type previously described substantially as well as natural poultry skin would adhere to such products.

Briefly, the present invention comprises a product consisting of a mixture of poultry skin and/or poultry meat and/or other edible poultry by-products which has been formed into a sheet having the protein partially coagulated or at least the surface protein thereof coagulated and which substantially resembles natural poultry skin. The product of the present invention may be produced by a method having the steps of comminuting poultry skin and/or poultry meat and/or other edible poultry by-products to form a fibrous matrix, forming said matrix under heat and pressure into the skin shape desired, and continuously heating said matrix to partially coagulate or coagulate at least the surface protein thereof, thereby forming the product which substantially resembles natural poultry skin.

These and other objects of the invention will be apparent from the following detailed description.

DESCRIPTION OF THE PREFERRED EMBODIMENTS

As is well known in the art, poultry may be obtained in eviscerated form, already cut up into parts, i.e., legs, thighs, breasts, etc. The meat is then boned out to obtain the largest pieces practical. These boneless meat pieces may then be combined with a binder matrix material to form a poultry food product as described in the David Torr Pat. Re. 26,182 entitled Method of Preparing an Edible Meat Product. As previously discussed, this invention relates to a fabricated skin and the method of preparing such fabricated skin for use in covering poultry products of the class described in the aforementioned Torr patent.

Raw poultry skin of various sizes is readily available in contrast to the unavailability of poultry skin in the size required to serve as a covering for products of the class discussed. This raw poultry skin is utilized herein, in conjunction with poultry meat and/or other edible poultry by-products in the formation of a matrix or emulsion having coarse particles therein.

The emulsion or matrix is formed by a mixture of poultry skin and/or meat and/or edible by-products. The desirable multitude of the particles of the matrix or emulsion should be such that the particles do not have a size dimension larger than ¼" and preferably have at least one size dimension larger than .020" with the particle sizes falling primarily within these 2 size limitations. If all the particles were to have a size dimension larger than ¼", the product produced would not have the desired looks of natural poultry skin and if all the particles were to have dimensions less than a .020" it would not produce the desired fiber structure to resemble natural poultry skin. From the foregoing, it is apparent, that to achieve the desired appearance of natural poultry skin it is necessary that a substantial portion of the particles in the matrix have sizes which do not have a dimension in excess of ¼" and which are not smaller than .020". The poultry materials are preferably converted to the desired particle formation by use of a standard cutter, preferably of the rotating bowl type having rotating cutter blades disposed normally to the base of the bowl, such as a Schnell-kutter, or Hobart Vertical Cutter Mixer, but not limited to these types of cutters alone. The raw poultry material is placed in the cutter and as comminution commences, ice is gradually introduced to the cutter to lower the temperature of the ingredients therein. Other ingredients may be added during the chopping operation. These ingredients or condiments include salt, phosphates or other condiments normally used in poultry processing. This procedure only insures adequate intermixing of ingredients while reducing heat build-up, however, any other procedure capable of achieving comparable results would be applicable. During the preparation of the matrix, the temperature thereof should be maintained at a chilled temperature below approximately 50° F. This is accomplished either by the addition of ice to the matrix or by pre-chilling the ingredients before they are subjected to the comminuting operation. It should be noted that it is desirable to use ice in the comminution operation since not only does the ice serve to cool the matrix but also acts as a lubricant which enables a more complete mixing of the ingredients contained in the cutter. Based upon the quantity of product in the cutter, the duration of time required to effectuate this phase will vary but should be sufficient to obtain a matrix or emulsion having a substantial portion of the particles therein which have sizes which do not have a dimension in excess or ¼" and which are not smaller than .020". Satisfactory results have been obtained when the chopping time did not exceed 6 minutes and preferably lasted for approximately 2 minutes. However, this is merely illustrative of the times to be used in the chopping operation and other chopping times may be utilized to obtain the particle sizes previously set forth. The finalized emulsion should be very tacky and paste-like in substance and be at a chilled temperature below approximately 50° F. It should be realized that mechanically deboned meat may be utilized or that the skin and meat may be chopped separately and blended together, however, it is preferable that the meat and skin be chopped or reduced to the desired size in a single operation in order to obtain a uniform distribution of meat and skin throughout the emulsion or matrix.

It is possible to form the emulsion or matrix totally from comminuted poultry skin, however, it has been found that a more desirable derma-fiber skin may be produced when poultry meat and/or edible poultry by-products such as neck meat and residual carcass meat, are contained in the emulsion. The presence of meat in the emulsion serves to reduce the shrinkage of the derma-fiber skin when it is coagulated as will be described hereinafter. The functional limits for the skin present in the emulsion is approximately 10%–70% by weight of the emulsion and the poultry meat may be present in the range of approximately 80%–20% by weight of the emulsion. The remainder of the formula for the matrix consists of the ice added during the chopping operation, salt, and other condiments. The desired skin characteristics are best obtained when the poultry skin is 50% or less of the weight of the emulsion and preferably should constitute approximately 35%–40% of the matrix with the poultry meat, edible poultry by-products and mixtures of the foregoing being present in the range of approximately 55%–50% by weight of the matrix. Either white or dark poultry meat will perform equally well or a combination of these meats may be used in preparing the matrix. It may be desirable to control the white and dark meat added to the matrix since the amount of dark meat used will effect the coloring of the skin when it is cooked. Preferably for the derma-fiber skin to attain the desired color, the dark meat should not exceed 50% of the meat added.

A predetermined portion of the matrix material is then subjected to pressure and heat so that it forms the size and thickness of skin desired. This pressing operation may be carried out in any convenient manner so that controlled dimensions or shape will be attained by the pressed out matrix. Preferably this is achieved by placing a sufficient quantity of the matrix between two heated platens. The platens are designed to form the matrix into the desired shape and thickness and the heat applied by the platens makes the matrix sufficiently flowable to assume the desired shape when pressure is applied. The platens may be brought together either by hand or by mechanical means such as an air cylinder drive depending on the operators preference, to apply the desired pressure to shape the matrix. By heating the platens when the pressure is applied, the fat content of the matrix allows a faster and more even spread of the matrix into the desired skin shape. The pressure applied by the platens should be sufficient to spread the quantity of matrix into the desired shape with a uniform thickness. The desired thickness may be controlled by having the platens engage limits which will restrict the pressing action of the platens to control the thickness of the matrix. The thickness of the skin should be controlled as to approximate the thickness of skin naturally occurring in poultry. Satisfactory skins have been fabricated which are .010–.250 inch in thickness, but preferably the thickness of the matrix should be maintained to be in the range from .010 to .125 inch and desirably approximately .060 to .125 inch in thickness. It is possible to utilize the pressed out matrix as a skin for poultry products, however, for ease of handling and for production purposes it is desirable to simultaneously heat the formed matrix to partially coagulate or coagulate at least the surface proteins of the matrix. This heating and coagulation step should be carried out while the matrix is under pressure to keep the dermafiber skin from shrinking and/or shriveling. This may be achieved by any convenient method such as having heating elements in the platens. The temperature applied to the matrix should preferably be within the range of approximately 110° F.–210° F. It has been found that this temperature range permits the proper degree of distribution of the matrix and coagulation of the protein during the formation of the skin. Higher temperatures may have the effect of coagulating the protein before the distribution of the matrix into the desired size and shape of the skin has been accomplished. The time to which the matrix is subjected to temperatures in this range will depend on the volume of material heated and should be for a sufficient period of time to partially coagulate the protein of the matrix and form a product which resembles the looks and taste of natural poultry skin. Preferably for the sizes of skins described herein the heating within the range of 110° F.–210° F. should be for a period of time of approximately 3–90 seconds. If skins of varying sizes are prepared the heating time may have to be adjusted so as to enable the matrix to be distributed uniformly to the desired shape and to effect the proper degree of coagulation of the protein to form an artificial skin. Desirably for artificial skins as described herein which are to be ⅛" in thickness the temperature should be in the range of 110° F.–210° F. and the heating should be for a time of approximately 3–50 seconds. It is desired that the heating step be effective to partially coagulate the protein of the matrix, and preferably the surface proteins since any thorough or complete cooking of the matrix results in the fabricated skin being tough when subsequently used in connection with a poultry product. However, at least the surface proteins of the matrix should be coagulated in order that the skin may be handled without tearing. Desirably, when matrix is pressed to a size 7" x 11" x ⅛" it should be heated to approximately 130° F. for approximately 20 seconds to achieve the proper coagulation of protein which binds the matrix to form a fabricated skin which substantially resembles natural poultry skin in looks, color, taste, and handling.

The fabricated skin may then be placed on a poultry product of the type described in Torr Pat. Re. 26,182, and frozen. The fabricated skin exhibits good adhesive qualities to the frozen poultry product and remains in adhered relation to the poultry product even when the product is cooked. Since only partial coagulation of the protein of the matrix is effected during the formation of the fabricated skin, the subsequent cooking operation does not deleteriously effect the fabricated skin and it substantially acts like natural poultry skin. It should be understood that although the pressing and heating operation are described as being carried out with platens, that with appropriate machine design the production of derma-fiber skin could be carried out on a continuous basis.

In order to better understand the present invention reference will be had to the following examples. However, it should be understood that no undue limitations or restrictions are to be imposed by reason of the following examples:

EXAMPLE I

Seven pounds of white and dark turkey carcass meat pieces or trimmings (50% each), normally considered edible by-products, were placed into a Schnellkutter. Added to this was 4 pounds of turkey skin and 4 oz. of solution containing flavorings which were chopped at low speed (approximately 1750 r.p.m.) for fifteen seconds. To this mixture 10 grams of salt were added and the cutter run for an additional 15 seconds to obtain uniform distribution of the salt. Fourteen ounces of ice were then added and the cutter run on high speed (approximately 3500 r.p.m.) for 90 seconds. The poultry skin thus amounted to approximately 35% of the total weight of the product and the total chopping time was approximately 2 minutes. Approximately 3½ oz. of the matrix was placed on a heated platen having a 7" x 11" x ⅛" cavity and pressure was applied to the matrix by another platen causing it to spread evenly throughout the cavity. Heat at approximately 130° F. for approximately 20 seconds was applied to the matrix material in the cavity which was effective to partially coagulate the protein of the matrix material to form a fabricated skin. The fabricated skin was placed on a turkey roast and the roast and skin were then frozen. The fabricated skin adhered to the frozen roast very well. The roast was then cooked at 450° F. for 2½ hours. The fabricated skin remained in adhered relation to the turkey roast and had the looks, color and taste substantially similar to natural poultry skin.

EXAMPLE 2

A fabricated skin was prepared using the following formula:

| Formulations: | Lbs. |
| --- | --- |
| Whole skin (turkey) | 1.000 |
| White meat (turkey) | 5.503 |
| Dark meat (turkey) | 2.358 |
| Ice | 0.706 |
| Salt | 0.202 |
| Sodium phosphates | 0.161 |
| Sodium erythorbate solution | 0.070 |
| | 10.000 |

Procedure: The white meat, dark meat and skin were placed in silent cutter and chopped for about 15 seconds. Salt, dry phosphate, sodium erythorbate solution and one-half of the ice were added to cutter and chopped for about 15 seconds. The remaining ice was added and the mixture chopped for approximately 85 seconds.

The poultry skin thus amounted to approximately 10% and the poultry meat to approximately 80% of the matrix and the total chopping time was almost 2 minutes. Approximately 8 ounce of the matrix was placed between plastic film and inserted between heated platens. The heated platens defined a 9" x 14" x ⅛" cavity. The heated platens were pressed together to form the matrix into a skin having a shape 9" x 14" x ⅛". Heat at approximately 130° F. was applied for approximately 45 seconds to produce a fabricated skin.

In addition approximately 16 ounce of matrix was heated by platens defining a 9" x 14" x ¼" cavity. Heat at approximately 130° F. was applied for approximately 90 seconds to produce a fabricated skin. These skins although functional for some purposes appeared to be slightly more dry and tough than the skins formed in Example 1.

EXAMPLE 3

The procedure of Example 2 was followed using the following formula for the matrix:

| Formulations: | Lbs. |
| --- | --- |
| Whole skin (turkey) | 4.000 |
| White meat (turkey) | 3.403 |
| Dark meat (turkey) | 1.458 |
| Ice | 0.706 |
| Salt | 0.202 |
| Sodium phosphates | 0.161 |
| Sodium erythorbate solution | 0.070 |
| | 10.000 |

The poultry skin was approximately 40% of the matrix and the poultry meat was approximately 50%.

The matrix was placed between the platens and heated as described in Example 2 to produce fabricated skins which were ⅛" and ¼" in thickness. The ⅛" and ¼" skins fabricated exhibited looks, color and taste which were slightly superior to those of Example 2 and were substantially the same as the skin of Example 1.

EXAMPLE 4

The procedure of Example 3 was followed using the following formula for the matrix:

| Formulations: | Lbs. |
| --- | --- |
| Whole skin (turkey) | 7.000 |
| White meat (turkey) | 1.303 |
| Dark meat (turkey) | 0.558 |
| Ice | 0.706 |
| Salt | 0.202 |
| Sodium phosphates | 0.161 |
| Sodium erythorbate solution | 0.070 |
| | 10.000 |

The poultry skin was approximately 70% of the matrix and the poultry meat was approximately 20%.

The matrix was placed between the platens and heated as described in Example 2 to produce fabricated skins which were ⅛" and ¼" in thickness. However, these skins exhibited less binding and were more fat or oily to touch than the skins of Example 3, but are functional as artificial skins.

From the foregoing, it is now apparent that a novel food product, which substantially resembles natural poultry skin, meeting the objects set out hereinbefore is provided and that changes or modifications as to the method and product set forth in the disclosures by way of illustration may be made by those skilled in the art without departing from the spirit of the invention, as defined by the claims which follow.

We claim:

1. A method of preparing a fabricated skin from poultry meat and skin comprising the steps of forming a mixture of poultry skin and a poultry meat part selected from the group consisting of poultry meat, edible poultry by-products and mixtures of the foregoing, comminuting the mixture of the poultry meat part and skin to form a matrix having a substantial portion of the particles of the matrix having sizes which do not have a dimension in excess of ¼″ and which have at least one size dimension larger than .020″, the poultry skin in the matrix being within the range of approximately 10%–70% by weight of the matrix and the poultry meat part being within the range of 80%–20% by weight of the matrix, the matrix being maintained at a chilled temperature below approximately 50° F. during said comminution, forming a predetermined portion of said matrix under heat and pressure into the shape and size of skin desired, the thickness of said skin being controlled to approximately the thickness of natural poultry skin, and heating the formed matrix while under pressure to a temperature of approximately 110° F.–210° F. for a period of approximately 3–90 seconds to partially coagulate the proteins thereof and form a product which resembles the looks and taste of natural poultry skin.

2. The method according to claim 1 wherein the comminuting step to obtain the matrix having a substantial portion of the particles therein having sizes which do not have a dimension in excess of ¼″ and which have at least one size dimension larger than .020″ is performed by subjecting the mixture to a chopping action for a period of 2 to 6 minutes.

3. The method according to claim 1 wherein the fabricated skin has a thickness in the range of .010–.250 inch.

4. The method according to claim 3 wherein the fabricated skin has a thickness in the range of approximately .060–.125 inch.

5. The method according to claim 3 wherein dark meat does not consist of more than 50% of the poultry meat part utilized in forming the matrix.

6. The method according to claim 3 wherein the poultry skin in the matrix is approximately 35–40% by weight of the matrix and the poultry meat part, is approximately 55–50% by weight of the matrix.

7. A method of preparing a fabricated skin from poultry meat and skin which resembles the looks and taste of natural poultry skin comprising the steps of forming a mixture of poultry skin and a poultry meat part selected from the group consisting of poultry meat, edible poultry by-products and mixtures of the foregoing, comminuting the mixture of the poultry meat part and skin to form a matrix having a substantial portion of the particles of the matrix having sizes which do not have a dimension in excess of ¼″ and which have at least one size dimension larger than .020″, the poultry skin in the matrix being within the range of approximately 10–70% by weight of the matrix and the poultry meat part, being within the range of approximately 80%–20% by weight of the matrix, the matrix being maintained at a chilled temperature below approximately 50° F. during said comminution, forming a predetermined portion of said matrix under heat and pressure into the shape and size of skin desired, the thickness of the skin being within the range of approximately .010–.125 inch, and heating the formed matrix while under pressure to a temperature of approximately 110° F.–210° F. for a period of time between 3 and 50 seconds to coagulate at least the surface proteins thereof and form a product which resembles the looks and taste of natural poultry skin.

8. The method according to claim 7 wherein the poultry skin in the matrix is approximately 35–40% by weight of the matrix and the poultry meat part is approximately 55–50% by weight of the matrix.

9. The method according to claim 7 wherein the heating step is carried out at approximately 130° F. for approximately 20 seconds.

10. The method according to claim 7 wherein the comminuting step to obtain the matrix having a substantial portion of the particles therein having sizes which do not have a dimension in excess of ¼″ and which have at least one size dimension larger than .020″ is performed by subjecting the mixture to a chopping action for a period of 2 to 6 minutes.

11. The fabricated poultry product produced by the method of claim 1.

References Cited
UNITED STATES PATENTS

| 3,268,339 | 8/1966 | Torr | 99—108 |
| 3,276,880 | 10/1966 | Torr | 99—107 |

HYMAN LORD, Primary Examiner

U.S. Cl. X.R.

99—107